(12) United States Patent
Walker et al.

(10) Patent No.: US 8,270,899 B2
(45) Date of Patent: *Sep. 18, 2012

(54) GROUND-BASED BEAMFORMING FOR SATELLITE COMMUNICATIONS SYSTEMS

(75) Inventors: John L. Walker, Union City, CA (US); Rolando Menendez, Campbell, CA (US); Douglas Burr, San Jose, CA (US); Gilles Dubellay, Mountain View, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,468

(22) Filed: Aug. 13, 2010

(65) Prior Publication Data

US 2010/0302971 A1 Dec. 2, 2010

Related U.S. Application Data

(63) Continuation of application No. 11/467,490, filed on Aug. 25, 2006, now Pat. No. 7,787,819.

(51) Int. Cl.
*H04B 15/00* (2006.01)
(52) U.S. Cl. ...... 455/13.2; 455/12.1; 455/427; 342/174; 342/373; 370/316
(58) Field of Classification Search .................. 455/427, 455/430, 12.1, 13.1, 13.2, 13.3, 67.11, 67.14, 455/67.16, 69; 342/174, 354, 373; 370/316
See application file for complete search history.

(56) References Cited

U.S. PATENT DOCUMENTS

| | | | |
|---|---|---|---|
| 5,530,449 A | 6/1996 | Wachs et al. | |
| 5,742,908 A | 4/1998 | Dent | |
| 5,771,019 A | 6/1998 | Wachs et al. | |
| 5,784,030 A | 7/1998 | Lane et al. | |
| 5,832,379 A | 11/1998 | Mallinckrodt | |

(Continued)

FOREIGN PATENT DOCUMENTS

EP 0812027 A1 12/1997

(Continued)

OTHER PUBLICATIONS

Hreha, William, et al., "Ground-Based Beamforming in Communication Satellites" APSCC Quarterly Newsletter, Jul. 2006, pp. 28-31.

(Continued)

*Primary Examiner* — Lester Kincaid
*Assistant Examiner* — Steven Kelley
(74) *Attorney, Agent, or Firm* — Weaver, Austin, Villeneuve & Sampson, LLP

(57) ABSTRACT

Methods, systems and apparatus for ground-based beamforming of a satellite communications payload (200) within a satellite communications network (100). An embodiment of the invention comprises a satellite (11) communicatively coupled to at least one gateway (12) via a feeder link (13) and a plurality of user terminals (16), each communicatively coupled with the satellite by a user link (17) where a ground based beam forming system (400) receives, via feeder link (13), return path signals (452) traveling from the user terminals (16) via the satellite (11) to the at least one gateway (12) and forward path signals (457) traveling from the at least one gateway (12) via the satellite (11) to the user terminals (16), and measures and corrects amplitude and phase errors of the return path signals (452) and the forward path signals (457).

9 Claims, 4 Drawing Sheets

U.S. PATENT DOCUMENTS

| | | | |
|---|---|---|---|
| 5,861,843 | A | 1/1999 | Sorace et al. |
| 5,903,549 | A | 5/1999 | Von der Embse |
| 5,995,040 | A | 11/1999 | Issler et al. |
| 6,014,372 | A | 1/2000 | Kent et al. |
| 6,020,845 | A | 2/2000 | Weinberg |
| 6,249,514 | B1 | 6/2001 | Campanella |
| 6,272,317 | B1 | 8/2001 | Houston et al. |
| 6,324,381 | B1 | 11/2001 | Anselmo et al. |
| 6,336,030 | B2 | 1/2002 | Houston et al. |
| 6,421,528 | B1 | 7/2002 | Rosen et al. |
| 6,490,448 | B1 | 12/2002 | Hogberg et al. |
| 6,615,024 | B1 | 9/2003 | Boros et al. |
| 6,628,919 | B1 | 9/2003 | Curello et al. |
| 6,654,590 | B2 | 11/2003 | Boros et al. |
| 6,668,161 | B2 | 12/2003 | Boros et al. |
| 6,694,137 | B2 | 2/2004 | Sharon |
| 6,745,004 | B2 | 6/2004 | Martin et al. |
| 6,757,546 | B1 | 6/2004 | Hagen et al. |
| 6,895,217 | B1 | 5/2005 | Chang et al. |
| 6,934,563 | B2 | 8/2005 | Raghothaman et al. |
| 6,963,742 | B2 | 11/2005 | Boros et al. |
| 7,260,411 | B2 | 8/2007 | Anderson et al. |
| 7,327,698 | B1 | 2/2008 | Anselmo |
| 7,447,501 | B2 | 11/2008 | Karabinis |
| 7,634,229 | B2 * | 12/2009 | Karabinis .................... 455/12.1 |
| 7,728,766 | B2 | 6/2010 | Draganov et al. |
| 7,787,819 | B2 | 8/2010 | Walker et al. |
| 7,890,052 | B2 * | 2/2011 | Chang et al. ................. 455/13.2 |
| 2002/0098872 | A1 | 7/2002 | Judson |
| 2002/0186779 | A1 | 12/2002 | Gollamudi |
| 2005/0288011 | A1 | 12/2005 | Dutta |
| 2007/0281612 | A1 | 12/2007 | Benjamin et al. |
| 2008/0051080 | A1 | 2/2008 | Walker et al. |

FOREIGN PATENT DOCUMENTS

| | | |
|---|---|---|
| WO | WO98/020618 | 5/1998 |

OTHER PUBLICATIONS

U.S. Office Action Advisory Action dated Feb. 2, 2010 issued in U.S. Appl. No. 11/467,490.

U.S. Office Action dated May 13, 2009 issued in U.S. Appl. No. 11/467,490.

U.S. Final Office Action dated Nov. 20, 2009 issued in U.S. Appl. No. 11/467,490.

US Notice of Allowance dated Jun. 30, 2010 issued in U.S. Appl. No. 11/467,490.

* cited by examiner

US 8,270,899 B2

GROUND-BASED BEAMFORMING FOR SATELLITE COMMUNICATIONS SYSTEMS

RELATED APPLICATION DATA

This application is a continuation of and claims priority under section 35 U.S.C. 120 to U.S. patent application Ser. No. 11/467,490, entitled GROUND-BASED BEAMFORMING FOR SATELLITE COMMUNICATIONS SYSTEMS filed on Aug. 25, 2006, the entire disclosure of which is incorporated herein by reference for all purposes.

TECHNICAL FIELD

This invention pertains to the field of satellite communications networks, and, in particular, to forming satellite beams from elementary feeds using largely ground-based apparatus and methods.

BACKGROUND ART

Many satellite communications systems require multiple beams to be placed over a geographic area. FIG. 3, for example, illustrates a pattern of coverage to provide service to the United States from a geostationary satellite located at 91 degrees west longitude. Numerous narrow beams may be formed from a relatively few elementary feeds by a process known as beamforming and described, for example, in U.S. Pat. Nos. 5,115,248 and 5,784,030. FIG. 3, for example, shows a pattern of 135 spot beams created from a feed array having only 48 elements. Adaptive beamforming permits electrical reconfiguration of the direction of each spot beam, or the formation of beams with different sizes and shapes, each accomplished without the need to change any hardware element.

A beamforming capability provides important benefits to many satellite payloads. For example, it permits a given satellite to operate from a number of different orbital locations. Thus, a satellite fleet operator licensed to operate geostationary spacecraft at multiple orbital locations may use a common hardware design for all locations and electrically configure the beam as required to tailor the spot beam pattern based on the satellite's location. Moreover, beamforming allows a satellite, which typically has a fifteen year life span, to be adapted on orbit to changing traffic patterns or new applications on the ground.

Beamforming, however, is technically challenging to perform on a satellite, inasmuch as the amplitude and phase relationship of each feed element within an array must be precisely set and provide for both the forward (gateway to satellite to user) signal path and the return (user to satellite to gateway) signal path. Conventional spacebased beamforming techniques include analog and digital beamforming networks (BFN's). Analog BFN's are generally co-located with the feed array because it is otherwise difficult to compensate for losses or electrical path length variations between the feed apertures and the points of application of the beamforming coefficients. Volume and thermal constraints limit the number of analog BFN's that can be co-located with the feed array.

Digital BFN's have a better ability to compensate for losses or electrical path length variations between the feed apertures and the points of application of the beamforming coefficients. Accordingly, they can be employed in the middle of the payload at a considerable electrical path distance from the feed array, provided that strict attention is paid to design practices minimizing amplitude and phase variations and calibration processes that accurately track the variations.

The burdens associated with space-borne BFN's can be substantial, and include system reliability degradation, and added hardware mass, cost, power consumption and thermal control requirements. Moreover, if the BFN is on the satellite, the ability to introduce improved technologies and react flexibly to changing market demand is limited during the life of the satellite. Moving BFN functions to the ground is therefore desirable, but ground-based beamforming systems must overcome several additional problems not inherent in space-based beamforming. Among these are the need to compensate for gateway and satellite component performance changes over temperature and life, satellite and ground station pointing errors, and signal propagation amplitude and phase dispersion effects, including Doppler shifts.

These difficulties have limited the use of ground-based beamforming techniques. Known prior art techniques apply beamforming in only the return direction, or are limited to signals that are code division or time division multiplexed. Frequency division multiplexing is more commonly used in space, and offers significant cost and reliability advantages over code division and time division multiplexing.

The present invention provides for ground-based beamforming for both the forward and return communications path. The invention further provides for ground-based beamforming that can be employed in a system employing frequency division multiplexed signals.

DISCLOSURE OF INVENTION

Methods, systems and apparatus for ground-based beamforming of a satellite communications payload (200) within a satellite communications network (100). An embodiment of the invention comprises a satellite (11) communicatively coupled to at least one gateway (12) via a feeder link (13) and further coupled to a plurality of user terminals (16), each communicatively coupled with the satellite by a user link (17). A ground based beam forming system (400) measures and corrects amplitude and phase errors of a plurality of return path signals (452) traveling from the user terminals (16) via the satellite (11) to at least one gateway (12), and measures and corrects amplitude and phase errors of a plurality of forward path signals (457) traveling from the at least one gateway (12) via the satellite (11) to the user terminals (16).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
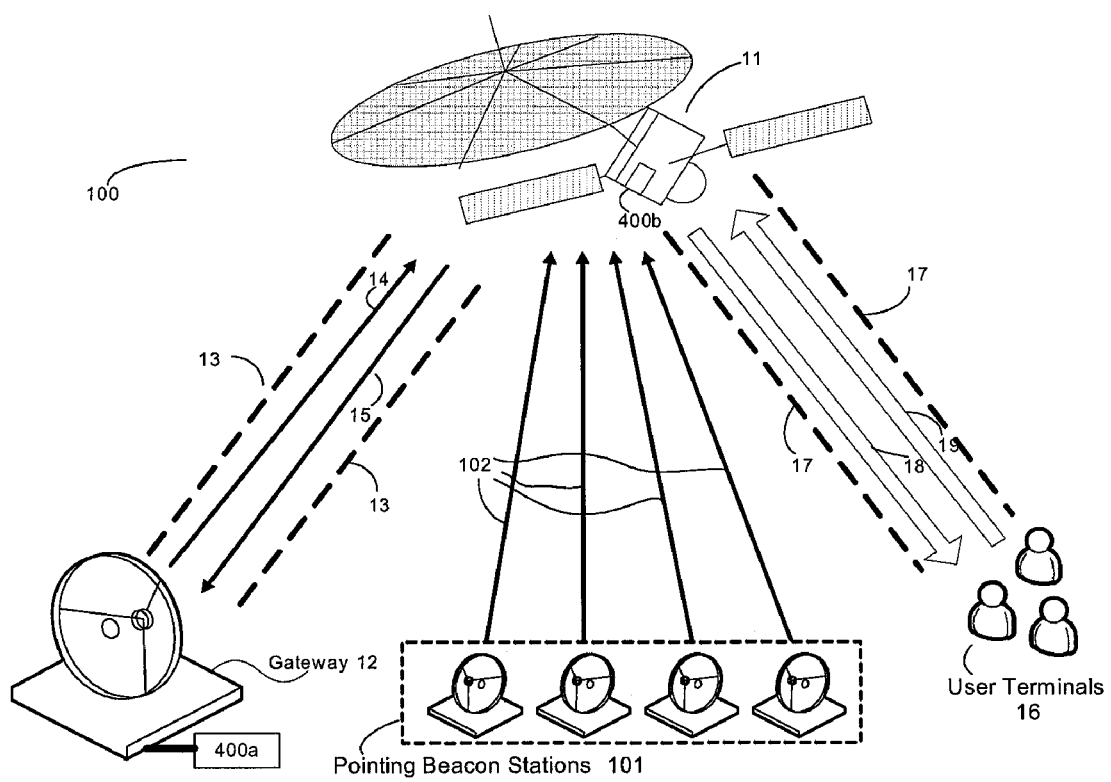
FIG. 1 is a system level diagram of an exemplary satellite communications network.

Ground-based beamforming (GBBF) is most advantageous for missions that require spatial re-utilization of communication spectrum (bandwidth) over the satellite field of view (FOV), as exemplified by, but not limited to, Mobile Satellite Systems (MSS) providing communications services to personal, often hand-held, terminals. Accordingly, FIG. 1 illustrates a simplified diagram of an exemplary MSS system 100 to which a GBBF system is advantageously applied. The MSS system includes a satellite 11, typically though not necessarily located at a geostationary orbital location defined by a longitude. Satellite 11 is communicatively coupled to at least one gateway 12 and to a plurality of user terminals 16. The user terminals 16 comprise satellite terminals that may be handheld mobile telephones or car phones, or may be embedded in laptop or desktop personal computers, or phone booths. The at least one gateway 12 is coupled to the public switched telephone network.

Each gateway 12 and the satellite 11 communicate over a feeder link 13, which has both a forward uplink 14 and a return downlink 15. Each user terminal 16 and the satellite 11 communicate over a user link 17 that has both a forward downlink 18 and a return uplink 19. Pointing beacon stations 101 are optionally employed to provide precise pointing feedback information to the GBBF system 400 as described hereinafter.

GBBF system 400 is a distributed control system having substantial elements 400a on the ground, preferably co-located with one gateway 12. These ground-based elements 400a communicate with pointing beacon stations 101, the co-located gateway 12, and, via the corresponding feeder link 13, with satellite 11. Certain space-based elements 400b of GBBF 400 are necessarily deployed on satellite 11, as discussed hereinafter.

Figure 2:
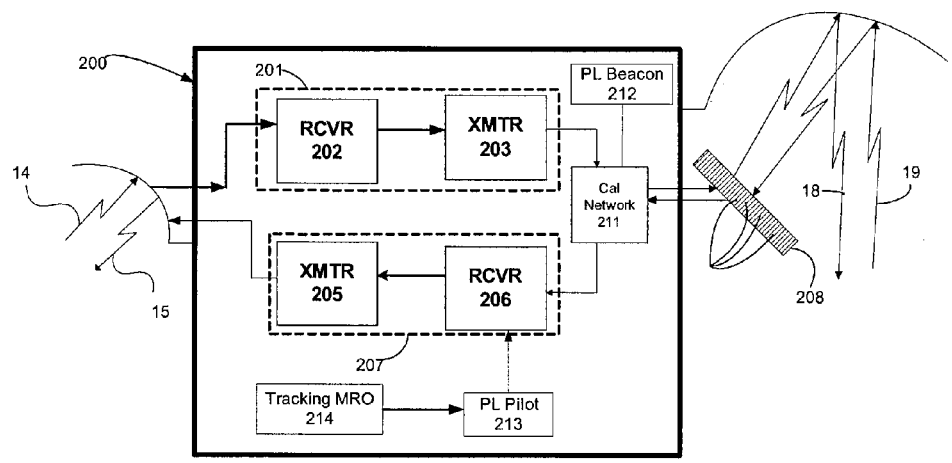
FIG. 2 is a block diagram of a satellite communications payload operable within the satellite communications network of FIG. 1.

FIG. 2 is a simplified block diagram of a communications payload system 200 within satellite 11. The communications payload system 200 has a satellite forward path 201 connecting forward uplink 14 to calibration network 211 by way of receiver 202 and transmitter 203. Satellite forward path 201 also typically includes frequency converters, multiplexers, demultiplexers, amplifiers, filters, and other components known in the art but not shown in FIG. 2 for purposes of clarity. Communications payload system 200 also has a satellite return path 207 connecting calibration network 211 to return downlink 15 by way of receiver 206 and transmitter 205. Again, many individual components known in the art are typically present in satellite return path 207 but have been omitted from FIG. 2 for purposes of clarity. Satellite forward path 201 and satellite return path 207 are communicatively coupled through calibration network 211 to forward downlink 18 and return uplink 19, respectively, by way of feed array 208 which has multiple feed elements 209.

As discussed in more detail hereinafter, four elements of GBBF 400 are integrated into satellite communications payload system 200: calibration network 211, payload beacon 212, payload pilot 213, and tracking master reference oscillator (MRO) 214. Calibration network 211 includes low loss couplers that (a) permit user communications traffic to pass transparently in the forward and return directions and (b) simultaneously generate signals having the same amplitude and phase characteristics as the user traffic signals at each feed element 209. These signals are passed to satellite return path 207 for transmission back to the at least one gateway 12. Payload beacon 212 provides an encoded signal of known phase and amplitude to calibration network 211 for use in providing forward path signal amplitude and phase error correction, as discussed herebelow. Payload pilot 213 is a signal generator for use in providing Doppler frequency shift correction and forward uplink power control as discussed herebelow. Tracking MRO 214 is a tracking master reference oscillator for use in providing Doppler frequency shift correction, as discussed herebelow.

Figure 3:
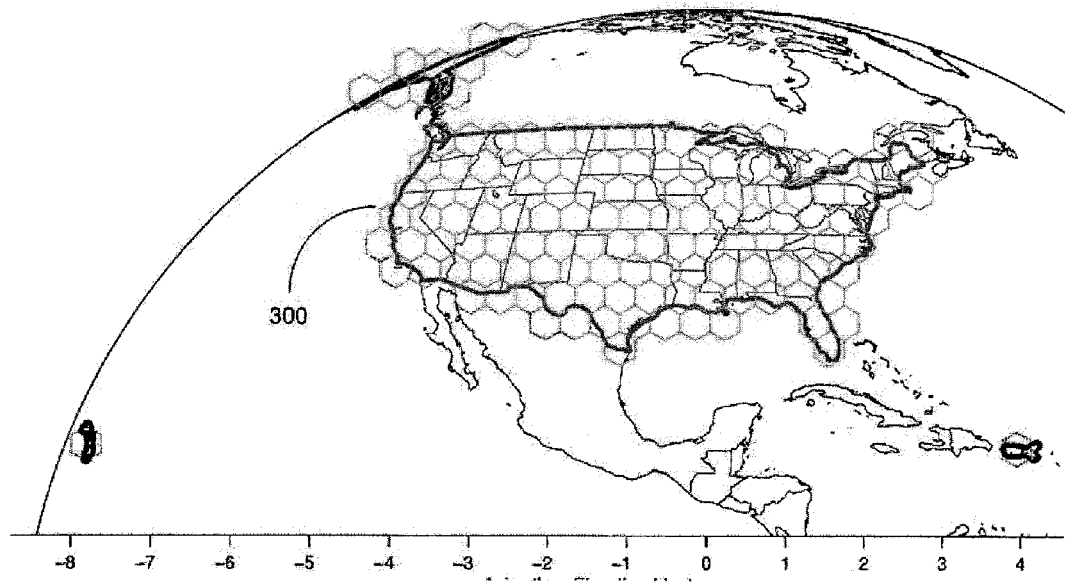
FIG. 3 illustrates an exemplary spot beam pattern suitable for the beamforming methods and apparatus of the present invention.

FIG. 3 is a pictorial representation of a beam pattern 300 that may be configured and controlled by the present invention. In the example shown in FIG. 3, a pattern of 135 spot beams covers the continental United States, Hawaii, Alaska and Puerto Rico.

Figure 4:
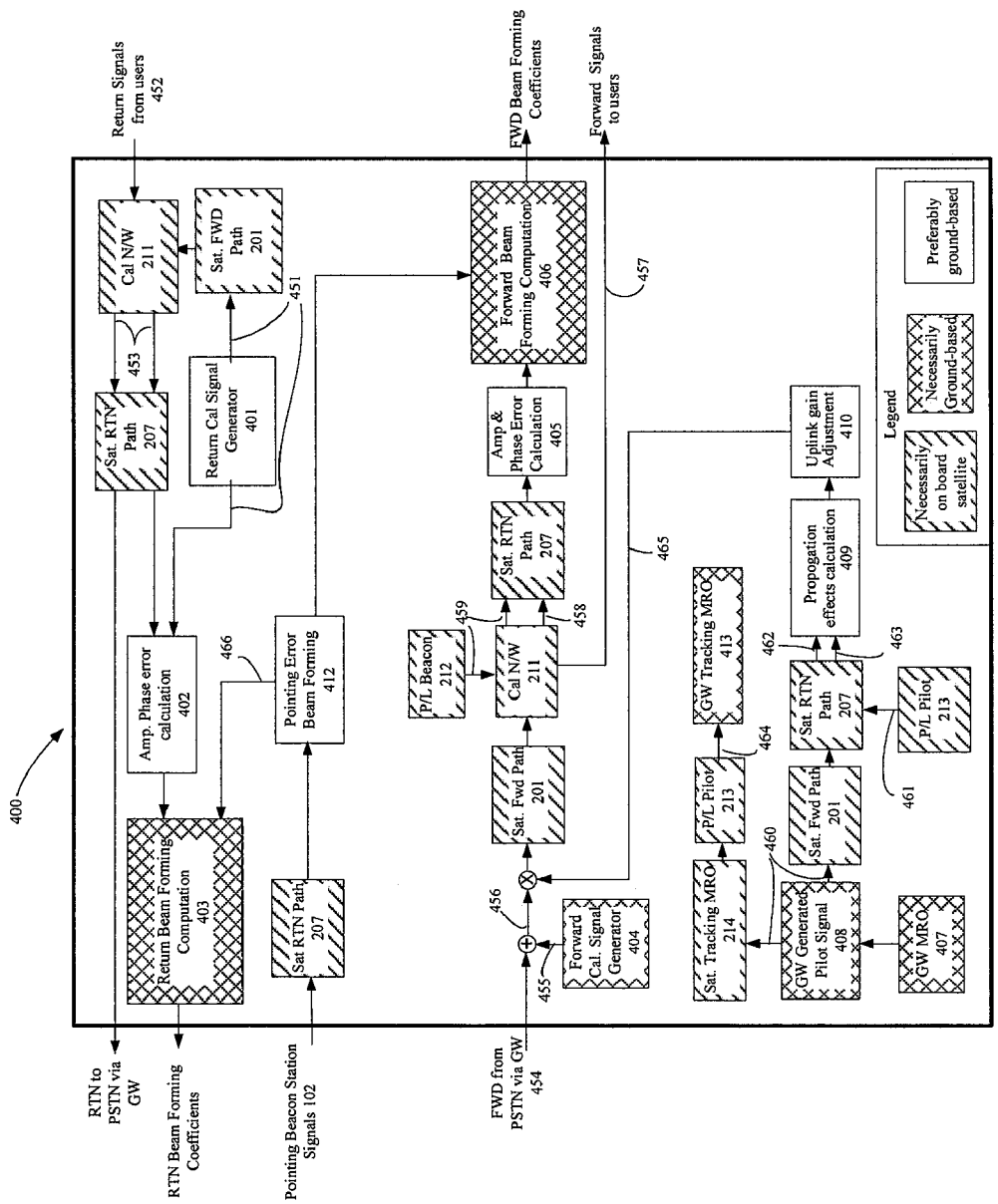
FIG. 4 is a block diagram of a ground-based beamforming system in accordance with the present invention.

FIG. 4 is a block diagram of a GBBF system 400 in accordance with the present invention. As indicated in FIG. 4, some space-based elements 400b of GBBF system 400 are necessarily deployed on satellite 11, others are necessarily disposed on the ground, and still others are preferably placed on the ground but may be deployed on satellite 11 without departing from the teachings of the present invention. The ground-based elements 400a of GBBF system 400 are preferably co-located with any one gateway 12.

Some elements of the GBBF system 400 are represented in FIG. 4 as computation or signal generating modules, which may be implemented in any combination of hardware, software and firmware. When implemented in software, the modules may be implemented in at least one computer readable medium, such as one or more hard disks, floppy disks, DVD's, CD's, etc.

The GBBF system 400 works cooperatively with certain standard conventional elements of the satellite communications network, for example, with satellite return path 207 and satellite forward path 201 of communications payload system 200. In the preferred embodiment described herein, the spaceborne elements 400b unique to GBBF system 400 are calibration network 201, payload beacon 212, payload pilot 213, and tracking master reference oscillator (MRO) 214.

GBBF system 400 constitutes a beamforming network that controls the overall shape of beam pattern 300 while in addition computing and applying beamforming coefficients that compensate for certain errors. Specifically, GBBF system 400 measures and corrects signal amplitude and phase errors associated with satellite return path 207, return downlink 15, forward uplink 14, and satellite forward path 201. Further, GBBF system 400 controls power of forward uplink 14, minimizes errors associated with Doppler frequency shifts in links 13 and 17, and corrects for satellite 11 pointing error. In a preferred embodiment, signals carried over each feeder link 13 are frequency domain multiplexed.

Return Path Signal Amplitude and Phase Error Correction.

An encoded return calibration signal 451 having a known amplitude and phase is generated at module 401 and transmitted to the satellite communications payload system 200 over each forward uplink 14. Module 401 also provides the encoded return calibration signal 451 to amplitude and phase error calculation module 402. In satellite 11, the encoded return calibration signal 451 is processed through satellite forward path 201 to calibration network 211. In calibration network 211, return signals 452, representing user communications traffic, are tagged with return calibration signal 451. The tagged signals 453 are processed through the satellite return path 207, and transmitted via return downlink 15 to amplitude and phase error calculation module 402. Module 402 compares the amplitude and phase of the received, tagged signals 453 to the amplitude and phase of the calibration signal 451 generated at module 401, the difference being representative of the amplitude and phase errors associated with satellite return path 207 and return downlink 15.

The output of amplitude and phase error calculation module 402 is used in return beamforming computation module 403 together with the output of pointing error beamforming module 412 to update the beamforming coefficients, which are applied to return path signals 452.

Forward Path Signal Amplitude and Phase Error Correction

An encoded forward calibration signal 455, having a known amplitude and phase, is generated by module 404. User signals representing forward communications traffic 454, typically originating in the PSTN and sent via gateway 12 are tagged with encoded forward calibration signal 455 and transmitted to satellite communications payload system 200 over forward uplink 14. In satellite 11, the tagged signals 456 are processed through satellite forward path 201, converted to the user frequency band, and passed through calibration network 211. Calibration network 211 outputs signals 457 representing user communications traffic to user terminals 16 via forward downlink 18. Couplers disposed within calibration network 211 generate signals 458 having the same amplitude and phase characteristics at each feed element 209 as signals 457. Encoded output 459 of payload beacon generator 212, which is a signal having a known phase and amplitude, is passed, along with signals 458, to amplitude and phase error calculation module 405 via satellite return path 207 and return downlink 15.

In a preferred embodiment, amplitude and phase error calculation module 405 determines a difference between the known amplitude and phase of encoded forward calibration signal 455 and amplitude and phase characteristics of the output signals 458 of the calibration network couplers, as received on the ground through return downlink 15. This difference is representative of an error associated with the signal's total path including the forward uplink 14, satellite forward path 201, satellite return path 207, and return downlink 15.

Amplitude and phase error calculation module 405 also determines a difference between the known amplitude and phase of encoded payload beacon signal 459 and the amplitude and phase characteristics of the payload beacon signal 459 as received at module 405. This difference is representative of an error associated with the signal's complete return path, including the satellite return path 207 and return downlink 15.

Finally, amplitude and phase error calculation module 405 determines the amplitude and phase error associated with the signal's complete forward path, including forward uplink 14 and satellite forward path 201, by subtracting the difference representative of an error associated with the complete return path from the difference representative of an error associated with the total path.

The output of amplitude and phase error calculation module 405 is used in forward beamforming computation module 406 to update the beamforming coefficients, which are applied to forward uplink signals 14.

Forward Uplink Power Control

A gateway generated pilot signal 460 is generated by module 408 and transmitted over forward uplink 14 to satellite communications payload 200, which passes gateway generated pilot signal 460 through satellite forward path 201. Gateway generated pilot signal 460 together with a payload pilot signal 461 generated by payload pilot module 213 is passed over satellite return path 207 to feeder link transmitter 205, which transmits transponded gateway generated pilot signal 462 and payload pilot signal 461 over return downlink 15. Propagation effects calculation module 409 determines the propagation effect associated with forward uplink 14, by comparing the signal level of the received payload pilot signal 463 to the signal level of transponded gateway generated pilot signal 462. This propagation effect is compensated for by uplink gain adjustment module 410, which provides a control signal 465 that adjusts the power level of forward uplink 14.

Doppler Frequency Shift Error Minimization

Although for many purposes, geostationary satellites may be considered motionless with respect to any point on the ground, they are nevertheless subject to drift velocities that produce noticeable Doppler frequency shifts that can prevent accurate ground-based beamforming. In accordance with a preferred embodiment of the present invention, errors associated with Doppler frequency shifts are minimized in the following manner. Gateway generated pilot signal 408 is locked to gateway master reference oscillator 407 and transmitted over forward uplink 14 to satellite communications payload 200, where it is applied to satellite tracking master reference oscillator 214. Satellite tracking master reference oscillator 214 is locked to payload pilot signal 213. Payload pilot signal 213 is transmitted over return downlink 15 to gateway tracking master reference oscillator 413, which is locked to the received payload pilot signal 464. All frequency conversions on the ground are locked to the gateway master reference oscillator 407 in the forward path direction, and locked to the gateway tracking master reference oscillator 413 in the return path direction. All frequency conversions on the satellite are locked to the satellite tracking master reference oscillator 214.

Satellite Pointing Error Correction.

Signals 102 generated by a plurality of pointing beacon stations 101 operating at known locations in the user frequency band are received by satellite 11 over uplinks operating at the same frequency as return uplink 19, passed through satellite return path 207, and transmitted to the ground over return downlink 15. Pointing error beamforming module 412 calculates and generates pointing error correction coefficients 466 to compensate for the error between the measured beam pointing direction and the desired beam pointing direction. Coefficients 466 are provided to forward and return beamforming computation modules 406 and 403, respectively.

Figure 5:
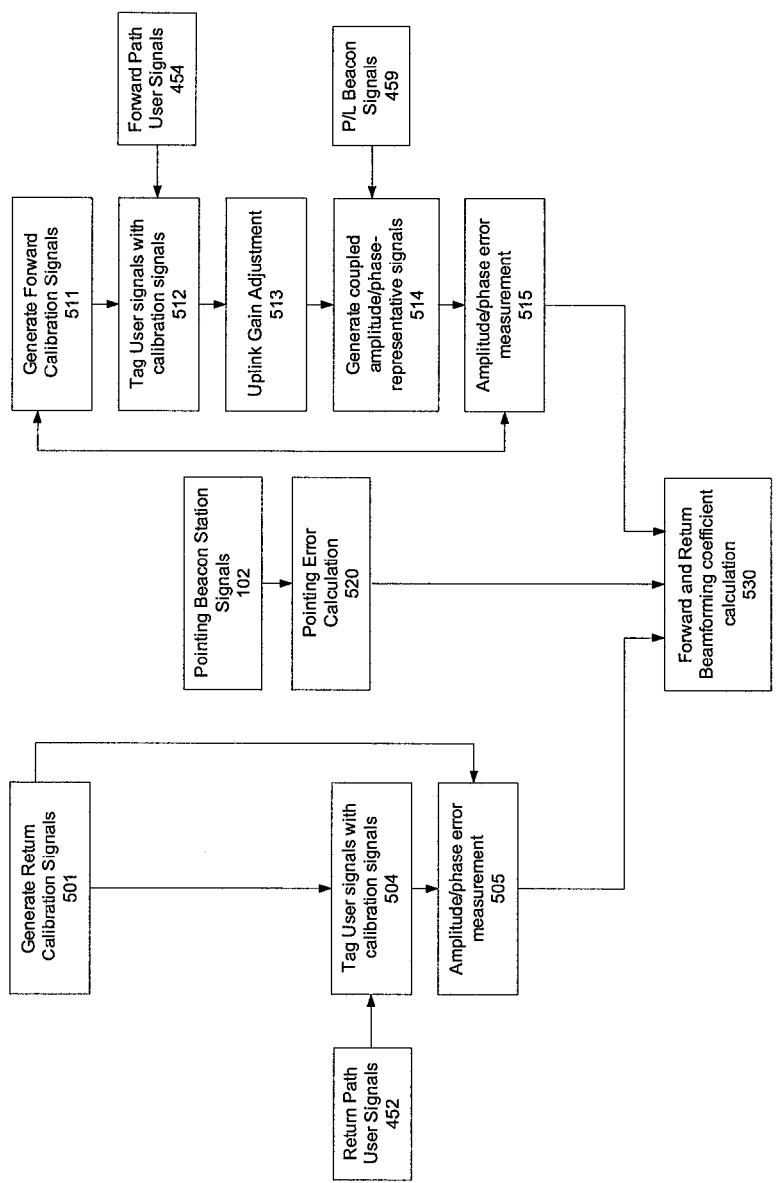
FIG. 5 is a process flow diagram illustrating a method for ground-based beamforming in accordance with the present invention.

The operation of the GBBF system 400 will now be discussed relative to the flow diagram shown in FIG. 5. At block 501, return calibration signal 451 having known amplitude and phase is generated by module 401 and passed through the satellite forward path 201 to the calibration network 211 which also receives ordinary return signals from users 452. At block 504, the user signals 452 are tagged with return calibration signal 451 by calibration network 211, and the tagged signals passed, through the satellite return path 207 to block 505. Amplitude and phase errors are measured at block 505 by module 402, which compares the known amplitude and phase of signals 451 with the amplitude and phase of signals received from block 504. The errors measured at block 505 are input to beam forming coefficient calculation, block 530.

At block 511, forward calibration signal 455 is generated by module 404. At block 512 ordinary forward path user signals 454 are tagged with the forward calibration signal 455. The tagged signals 456 are gain adjusted at block 513 by module 410, and passed through satellite forward path 201 to calibration network 211. Calibration network 211 also receives encoded payload beacon signals 459 having a known gain and amplitude from payload beacon generator 212. At block 514, amplitude and phase characteristics 458 of tagged user signals 456 are output by calibration network 211 along with payload beacon signals 459. Signals 458 and 459 are passed through the satellite return path 207 to block 515. Amplitude and phase errors are measured at block 515 by module 405, which compares the known amplitude and phase of signals 455 and 459 with the amplitude and phase of signals received from block 514. The errors measured at block 515 are input to beam forming coefficient calculation, block 530.

Pointing error calculation 520 receives pointing beacon station signals 102 and outputs a pointing error estimation to beam forming coefficient calculation, block 530.

At block 530, beamforming coefficients are calculated by modules 403 and 406 for the return and forward paths, respectively.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A satellite communications network having a ground-based beamforming (GBBF) system, said network comprising:
   a satellite, said satellite comprising a satellite communications payload, said satellite communications payload comprising a satellite return path and a satellite forward path;
   at least one gateway, communicatively coupled with the satellite via a feeder link;
   a plurality of user terminals, each communicatively coupled with the satellite by a user link;
   a plurality of pointing beacon stations adapted to transmit and receive signals to and from the satellite; wherein:
   the satellite communications payload comprises a satellite tracking master reference oscillator and a calibration network; and
   the GBBF system further comprises a master reference oscillator and a gateway tracking master reference oscillator; and
   the GBBF system:
      receives, via the feeder link, (i) a plurality of return path signals traveling from the user terminals via the satellite to the at least one gateway, and (ii) a plurality of forward path signals traveling from the at least one gateway via the satellite to the user terminals;
      measures a first set of amplitude and phase errors of the plurality of return path signals;
      corrects said first set of amplitude and phase errors by generating, on the ground, a first set of corrective beam forming coefficients and applying said first set of corrective beam forming coefficients to the return path signals;
      measures a second set of amplitude and phase errors of the plurality of forward path signals; and
      corrects said second set of amplitude and phase errors by generating, on the ground, a second set of corrective beam forming coefficients and applying said second set of corrective beam forming coefficients to the forward path signals; wherein
   the GBBF system corrects amplitude and phase errors of the plurality of return path signals by:
      generating an encoded return calibration signal having a known amplitude and phase that is received by the satellite communications payload and applied to each of a plurality of feed elements in a feed array;
      receiving from the calibration network over the satellite return path, and a return downlink between the satellite and the gateway, a plurality of tagged signals, each of the plurality of tagged signals comprising a combination of user communications traffic and the encoded return calibration signal;
      determining a difference between the known amplitude and phase of the encoded return calibration signal and an amplitude and a phase of each of the plurality of tagged signals, the difference being representative of amplitude and phase errors of the plurality of return path signals; and
      generating and applying corrective beamforming coefficients to minimize the amplitude and phase errors of the plurality of return path signals.

2. The satellite communications network of claim 1, wherein the encoded return calibration signal is applied to each of the plurality of feed elements in the feed array through the calibration network.

3. The satellite communications network of claim 1, wherein the encoded return calibration signal is applied to each of the plurality of feed elements in the feed array via a calibration horn.

4. The satellite communications network of claim 1, wherein the encoded return calibration signal is encoded by means of a Walsh function and pseudo random number scrambling.

5. The satellite communications network of claim 1, wherein the encoded return calibration signal is generated on-board the satellite.

6. A satellite communications network having a ground-based beamforming (GBBF) system, said network comprising:
   a satellite, said satellite comprising a satellite communications payload, said satellite communications payload comprising a satellite return path and a satellite forward path;
   at least one gateway, communicatively coupled with the satellite via a feeder link;
   a plurality of user terminals, each communicatively coupled with the satellite by a user link;
   a plurality of pointing beacon stations adapted to transmit and receive signals to and from the satellite; wherein:
   the satellite communications payload comprises a satellite tracking master reference oscillator and a calibration network; and
   the GBBF system further comprises a master reference oscillator and a gateway tracking master reference oscillator; and
   the GBBF system:
      receives, via the feeder link, (i) a plurality of return path signals traveling from the user terminals via the satellite to the at least one gateway, and (ii) a plurality of forward path signals traveling from the at least one gateway via the satellite to the user terminals;
      measures a first set of amplitude and phase errors of the plurality of return path signals;
      corrects said first set of amplitude and phase errors by generating, on the ground, a first set of corrective beam forming coefficients and applying said first set of corrective beam forming coefficients to the return path signals;
      measures a second set of amplitude and phase errors of the plurality of forward path signals; and
   corrects said second set of amplitude and phase errors by generating, on the ground, a second set of corrective beam forming coefficients and applying said second set of corrective beam forming coefficients to the forward path signals; wherein the GBBF system measures and corrects amplitude and phase errors of the plurality of forward path signals by:
      generating an encoded forward calibration signal having a known amplitude and phase and a plurality of tagged signals, each of the plurality of tagged signals comprising a combination of user communications traffic and the encoded forward calibration signal;

transmitting the plurality of tagged signals over a forward uplink to the communications payload, which passes the plurality of tagged signals through the satellite forward path and through the calibration network, which passes the plurality of tagged signals to a forward downlink, and passes amplitude and phase characteristics of the plurality of tagged signals through the satellite return path together with an inserted payload beacon signal having a known amplitude and phase;

receiving, over a return downlink, amplitude and phase characteristics of each of the plurality of tagged signals and a received payload beacon signal;

determining a difference between the known amplitude and phase of the encoded forward calibration signal and amplitude and phase characteristics of each of the plurality of tagged signals, which difference is representative of an error associated with a total path consisting of the forward uplink, the satellite forward path, the satellite return path and the return downlink;

determining a difference between the known amplitude and phase of the inserted payload beacon signal and an amplitude and phase of the received payload beacon signal, which difference is representative of an error associated with a complete return path, the complete return path consisting of the satellite return path and the return downlink;

subtracting the difference representative of the error associated with the complete return path from the difference representative of the error associated with the total path to obtain an error representative of a complete forward path, the complete forward path consisting of the forward uplink and the satellite forward path; and generating and applying corrective beamforming coefficients to minimize amplitude and phase errors of the plurality of forward path signals.

7. A satellite communications network having a ground-based beamforming (GBBF) system, said network comprising:

a satellite, said satellite comprising a satellite communications payload, said satellite communications payload comprising a satellite return path and a satellite forward path;

at least one gateway, communicatively coupled with the satellite via a feeder link;

a plurality of user terminals, each communicatively coupled with the satellite by a user link;

a plurality of pointing beacon stations adapted to transmit and receive signals to and from the satellite; wherein:

the satellite communications payload comprises a satellite tracking master reference oscillator and a calibration network; and the GBBF system further comprises a master reference oscillator and a gateway tracking master reference oscillator; and the GBBF system:

receives, via the feeder link, (i) a plurality of return path signals traveling from the user terminals via the satellite to the at least one gateway, and (ii) a plurality of forward path signals traveling from the at least one gateway via the satellite to the user terminals;

measures a first set of amplitude and phase errors of the plurality of return path signals;

corrects said first set of amplitude and phase errors by generating, on the ground, a first set of corrective beam forming coefficients and applying said first set of corrective beam forming coefficients to the return path signals;

measures a second set of amplitude and phase errors of the plurality of forward path signals; and corrects said second set of amplitude and phase errors by generating, on the ground, a second set of corrective beam forming coefficients and applying said second set of corrective beam forming coefficients to the forward path signals; wherein the GBBF system controls power of a forward uplink by:

transmitting a gateway generated pilot signal over the forward uplink to the satellite communications payload, which passes the gateway generated pilot signal through the satellite forward path, passes the gateway generated pilot signal together with a satellite generated payload pilot signal over the satellite return path to a feeder link transmitter, and transmits a transponded gateway generated pilot signal and the satellite generated payload pilot signal to the at least one gateway over a return downlink;

receiving the transponded gateway generated pilot signal and a received payload pilot signal from the return downlink;

determining a propagation effect associated with the forward uplink by comparing a signal level of the received payload pilot signal to a signal level of the transponded gateway generated pilot signal; and providing a control signal that adjusts a power level of the forward uplink to compensate for the propagation effect.

8. A satellite communications network having a ground-based beamforming (GBBF) system, said network comprising:

a satellite, said satellite comprising a satellite communications payload, said satellite communications payload comprising a satellite return path and a satellite forward path;

at least one gateway, communicatively coupled with the satellite via a feeder link;

a plurality of user terminals, each communicatively coupled with the satellite by a user link;

a plurality of pointing beacon stations adapted to transmit and receive signals to and from the satellite; wherein:

the satellite communications payload comprises a satellite tracking master reference oscillator and a calibration network; and the GBBF system further comprises a master reference oscillator and a gateway tracking master reference oscillator; and the GBBF system:

receives, via the feeder link, (i) a plurality of return path signals traveling from the user terminals via the satellite to the at least one gateway, and (ii) a plurality of forward path signals traveling from the at least one gateway via the satellite to the user terminals;

measures a first set of amplitude and phase errors of the plurality of return path signals;

corrects said first set of amplitude and phase errors by generating, on the ground, a first set of corrective beam forming coefficients and applying said first set of corrective beam forming coefficients to the return path signals;

measures a second set of amplitude and phase errors of the plurality of forward path signals; and corrects said second set of amplitude and phase errors by generating, on the ground, a second set of corrective beam forming coefficients and applying said second set of corrective beam forming coefficients to the forward path signals; wherein Doppler frequency shift errors are minimized by:
locking a gateway generated pilot signal to the master reference oscillator; transmitting the gateway generated pilot signal over a forward uplink to the satellite communications payload;
applying the gateway generated pilot signal to the satellite tracking master reference oscillator;
locking the satellite tracking master reference oscillator to a satellite generated payload pilot signal;
transmitting the satellite generated payload pilot signal over a return downlink to the at least one gateway;
receiving the satellite generated payload pilot signal at the at least one gateway; and
locking the gateway tracking master reference oscillator to the satellite generated payload pilot signal.

9. A satellite communications network having a ground-based beamforming (GBBF) system, said network comprising:
a satellite, said satellite comprising a satellite communications payload, said satellite communications payload comprising a satellite return path and a satellite forward path;
at least one gateway, communicatively coupled with the satellite via a feeder link;
a plurality of user terminals, each communicatively coupled with the satellite by a user link;
a plurality of pointing beacon stations adapted to transmit and receive signals to and from the satellite; wherein:
the satellite communications payload comprises a satellite tracking master reference oscillator and a calibration network; and
the GBBF system further comprises a master reference oscillator and a gateway tracking master reference oscillator; and the GBBF system:
receives, via the feeder link, (i) a plurality of return path signals traveling from the user terminals via the satellite to the at least one gateway, and (ii) a plurality of forward path signals traveling from the at least one gateway via the satellite to the user terminals;
measures a first set of amplitude and phase errors of the plurality of return path signals;
corrects said first set of amplitude and phase errors by generating, on the ground, a first set of corrective beam forming coefficients and applying, on the ground, said first set of corrective beam forming coefficients to the return path signals;
measures a second set of amplitude and phase errors of the plurality of forward path signals; and
corrects said second set of amplitude and phase errors by generating, on the ground, a second set of corrective beam forming coefficients and applying, on the ground, said second set of corrective beam forming coefficients to the forward path signals;
wherein satellite pointing errors are corrected by:
receiving pointing beacon signals generated by the plurality of pointing beacon stations operating at known locations over a return uplink;
transmitting the pointing beacon signals over a return downlink; and
calculating and compensating for errors between measured beam pointing direction and desired beam pointing direction.

* * * * *